(12) United States Patent
Stratton (10) Patent No.: US 12,312,092 B1
(45) Date of Patent: May 27, 2025

(54) ENERGY GENERATING DEVICE

(71) Applicant: Pratt & Whitney Canada Corp., Longueuil (CA)

(72) Inventor: Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/630,650

(22) Filed: Apr. 9, 2024

(51) Int. Cl.
| | |
|---|---|
| *B64D 27/33* | (2024.01) |
| *B60L 50/72* | (2019.01) |
| *B64D 27/10* | (2006.01) |
| *B64D 27/24* | (2024.01) |
| *B64D 27/355* | (2024.01) |
| *F02C 3/30* | (2006.01) |
| *F02C 6/18* | (2006.01) |
| *H01M 8/04014* | (2016.01) |
| *H01M 8/04082* | (2016.01) |
| *H01M 8/04119* | (2016.01) |

(52) U.S. Cl.
CPC .............. *B64D 27/33* (2024.01); *B60L 50/72* (2019.02); *B64D 27/10* (2013.01); *B64D 27/24* (2013.01); *B64D 27/355* (2024.01); *F02C 3/30* (2013.01); *F02C 6/18* (2013.01); *H01M 8/04022* (2013.01); *H01M 8/04156* (2013.01); *H01M 8/04208* (2013.01); *B60L 2200/10* (2013.01); *H01M 2250/20* (2013.01)

(58) Field of Classification Search
CPC ......... F02C 3/30; F02C 6/18; H01M 8/04022; H01M 8/04111; H01M 8/04156; H01M 8/04208; H01M 2250/20; B60L 50/72; B60L 2200/10; B64D 27/10; B64D 27/24; B64D 27/33; B64D 27/355
See application file for complete search history.

(56) References Cited

U.S. PATENT DOCUMENTS

| | | | |
|---|---|---|---|
| 2023/0035231 A1* | 2/2023 | Hu ....................... | B01D 5/0075 |
| 2024/0011436 A1* | 1/2024 | Terwilliger ............... | F02C 6/00 |
| 2024/0271548 A1* | 8/2024 | Terwilliger ............. | F01K 15/02 |

FOREIGN PATENT DOCUMENTS

| | | |
|---|---|---|
| FR | 3037106 B1 | 6/2017 |
| WO | 2023072532 A1 | 5/2023 |

* cited by examiner

*Primary Examiner* — Jason H Duger
(74) *Attorney, Agent, or Firm* — Getz Balich LLC (57) ABSTRACT

An aircraft propulsion system includes a gas turbine engine, a water-exhaust heat exchanger, and a fuel cell segment. The gas turbine engine has a compressor, a combustor, and a turbine. The engine is in drive communication with a rotational load component. The water-exhaust heat exchanger is disposed to receive exhaust gas exiting the turbine section. The fuel cell segment includes a liquid hydrogen evaporator, a fuel cell, and a water pump. The liquid hydrogen evaporator is configured to change a flow of liquid hydrogen to a flow of gaseous hydrogen. The fuel cell is configured to receive a flow of air and the flow of gaseous hydrogen and react them to produce electrical power and a flow of water. The flow of water from the fuel cell goes to the water-exhaust heat exchanger which converts the flow of water to a flow of steam.

15 Claims, 4 Drawing Sheets

ENERGY GENERATING DEVICE

BACKGROUND OF THE DISCLOSURE

1. Technical Field

This disclosure relates generally to an energy generating device for a turbine engine, and more particularly, an energy generating device that converts thermal energy into electrical energy.

2. Background Information

Interest in alternative options for power generation continues to grow. While power plants including electric power supplies and engines exist, other opportunities for harnessing energy are desired. In many aspects of power generation, thermal energy is created. Heat exchangers utilize thermal energy to heat (e.g., elevate temperature from ambient) or cool (e.g., decrease temperature from ambient) fluids (or engine components) germane to turbine engine function. Heat exchangers include, for example, a fuel-oil heat exchange (FOHE), a fuel-air heat exchange, or other fluid-fluid heat exchange. Such exchange leads to the transfer of thermal energy, and there is a need to make further use of such thermal energy for generating electrical energy.

SUMMARY OF THE DISCLOSURE

According to an aspect of the present disclosure, an aircraft propulsion system is provided that includes a gas turbine engine, a water-exhaust heat exchanger, and a fuel cell segment. The gas turbine engine has a compressor section, a combustion section having a combustor, a turbine section, and a turbine exhaust section. The gas turbine engine is in drive communication with a rotational load component. The water-exhaust heat exchanger is disposed relative to the turbine exhaust section so that a flow of exhaust gas exiting the turbine section is in communication with the water-exhaust heat exchanger. The fuel cell segment is configured to connect with a source of liquid hydrogen. The fuel cell segment includes a liquid hydrogen evaporator, a fuel cell, and a water pump. The liquid hydrogen evaporator is configured to change a first flow of liquid hydrogen from the source of liquid hydrogen to a first flow of gaseous hydrogen. The fuel cell is configured to receive a flow of air and the first flow of gaseous hydrogen and react the flow of air and the first flow of gaseous hydrogen to produce electrical power and a flow of water. The system is configured to provide the flow of water produced by the fuel cell to the water-exhaust heat exchanger, and the water-exhaust heat exchanger is configured to convert the flow of water to a flow of steam.

In any of the aspects or embodiments described above and herein, the system may include a hydrogen-exhaust heat exchanger disposed relative to the turbine exhaust section so that the flow of exhaust gas exiting the turbine section is in communication with the hydrogen-exhaust heat exchanger.

In any of the aspects or embodiments described above and herein, the system may include a liquid hydrogen pump configured to provide a second flow of liquid hydrogen to the hydrogen-exhaust heat exchanger for passage through the hydrogen-exhaust heat exchanger.

In any of the aspects or embodiments described above and herein, the hydrogen-exhaust heat exchanger may be configured to change the second flow of liquid hydrogen passing through the hydrogen-exhaust heat exchanger to a second flow of gaseous hydrogen.

In any of the aspects or embodiments described above and herein, the system may be configured such that the second flow of gaseous hydrogen exits the hydrogen-exhaust heat exchanger and is provided to the combustor.

In any of the aspects or embodiments described above and herein, the system may include a gaseous hydrogen turbine, and the second flow of gaseous hydrogen may pass through the gaseous hydrogen turbine prior to entering the combustor.

In any of the aspects or embodiments described above and herein, the gaseous hydrogen turbine may be configured to provide propulsion power to the rotational load component.

In any of the aspects or embodiments described above and herein, the system may be configured such that the flow of steam exits the water-exhaust heat exchanger and is provided to the combustor.

In any of the aspects or embodiments described above and herein, the system may include a steam turbine in fluid communication with the water-exhaust heat exchanger and in fluid communication with the combustor, and the system may be configured such that steam turbine receives the flow of steam from the water-exhaust heat exchanger and the combustor receives the flow of steam from the steam turbine.

In any of the aspects or embodiments described above and herein, the steam turbine may be configured to provide propulsion power to the rotational load component.

In any of the aspects or embodiments described above and herein, the liquid hydrogen evaporator may be a passive evaporator or an active evaporator.

In any of the aspects or embodiments described above and herein, the system may include a fuel pump in fluid communication with a source of jet fuel and in fluid communication with the combustor and configured to provide a flow of jet fuel to the combustor.

In any of the aspects or embodiments described above and herein, the system may be configured such that the flow of steam exits the water-exhaust heat exchanger and is provided to the combustor.

According to an aspect of the present disclosure, a method of providing propulsion power to an aircraft is provided that includes: providing a gas turbine engine having a compressor section, a combustion section having a combustor, a turbine section, and a turbine exhaust section, wherein the gas turbine engine is in drive communication with a rotational load component; providing a fuel cell segment configured to connect with a source of liquid hydrogen, the fuel cell segment having a liquid hydrogen evaporator, a fuel cell, and a water pump; providing a flow of air and a first flow of gaseous hydrogen to the fuel cell and operating the fuel cell to produce electrical power and a flow of water; operating the gas turbine engine to produce propulsion power to the rotational load component, and a flow of exhaust gas exiting the turbine section; producing a flow of steam by providing the flow of water produced by the fuel cell to a water-exhaust heat exchanger disposed relative to the turbine exhaust section so that the flow of exhaust gas exiting the turbine section is in communication with the water-exhaust heat exchanger; providing the flow of steam to the combustor during the operation of the gas turbine engine; and powering an aircraft component using the electrical power produced by the fuel cell.

In any of the aspects or embodiments described above and herein, the method may include providing a first flow of liquid hydrogen from the source of liquid hydrogen to the liquid hydrogen evaporator and changing the flow of liquid hydrogen to the first flow of gaseous hydrogen using the liquid hydrogen evaporator.

In any of the aspects or embodiments described above and herein, the method may include producing a second flow of gaseous hydrogen by providing a second flow of liquid hydrogen from the source of liquid hydrogen to a hydrogen-exhaust heat exchanger disposed relative to the turbine exhaust section so that the flow of exhaust gas exiting the turbine section is in communication with the hydrogen-exhaust heat exchanger, and passing the second flow of liquid hydrogen into the hydrogen-exhaust heat exchanger, wherein the hydrogen-exhaust heat exchanger is configured to change the second flow of liquid hydrogen passing through the hydrogen-exhaust heat exchanger to a second flow of gaseous hydrogen, and providing the second flow of gaseous hydrogen exiting the hydrogen-exhaust heat exchanger to the combustor.

In any of the aspects or embodiments described above and herein, the method may include providing a flow of jet fuel to the combustor.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
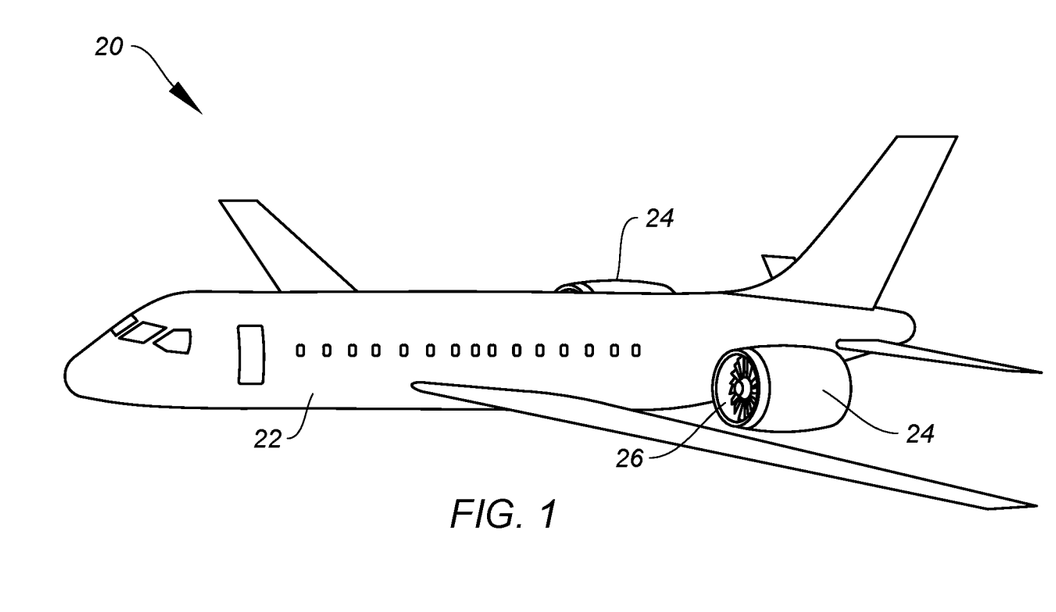
FIG. 1 is a diagrammatic illustration of an aircraft that may include present disclosure propulsion systems.

FIG. 1 illustrates a conventional fixed wing aircraft 20 that may utilize embodiments of the present disclosure. The aircraft 20 includes a fuselage 22 and a pair of nacelles 24. Each nacelle 24 houses a propulsion system 26 that provides thrust for the aircraft 20.

Figure 2:
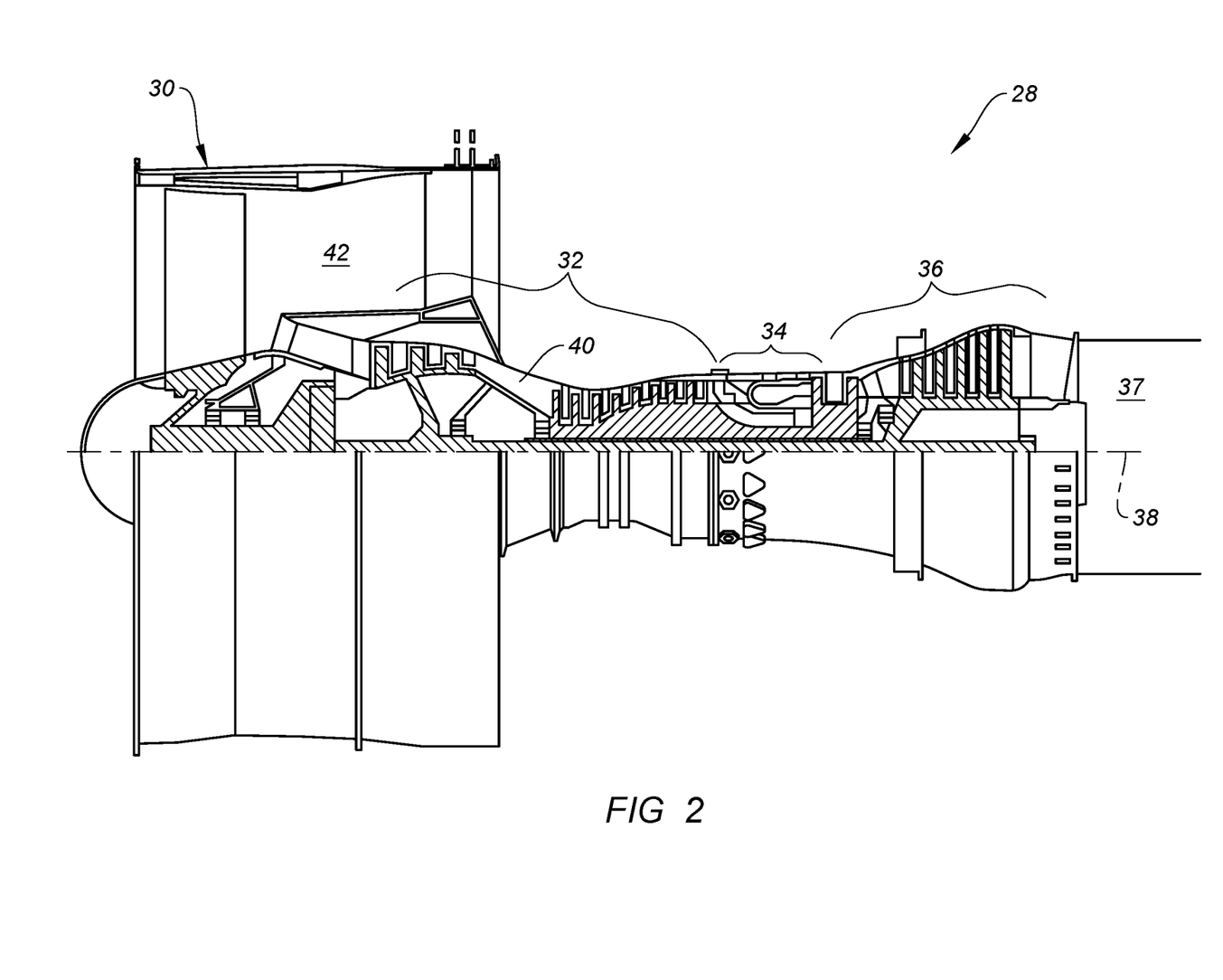
FIG. 2 is a diagrammatic representation of a gas turbine engine.

FIG. 2 diagrammatically illustrates an example of a turbine engine 28 that may be used in a present disclosure propulsion system 26 embodiment. The turbine engine 28 includes a fan section 30, a compressor section 32, a combustion section 34, and a turbine section 36. The engine 28 may be described as having a rotational axis 38. Air entering the forward/upstream end of the turbine engine 28 passes through the fan section 30. A portion of the air worked within the fan section 30 enters the compressor section 32 and travels generally axially through the compressor, combustor, and turbine sections 32, 34, 36, exiting through a turbine exhaust section 37. This gas path 40 is referred to typically as the "core gas path 40". The remainder of the air worked within the fan section 30 enters a bypass duct 42 and is typically referred to as "bypass air". Both the bypass air and the core gas produce thrust that may be used for propulsion. The present disclosure is not limited to the turbine engine 28 example shown in FIG. 2. For example, in some embodiments the turbine engine 28 may be configured as a geared turbine engine that drives the fan section 30 of a propulsion system 26, or a propeller in a turboprop, at a lower rotational speed than the rotational speed of an engine shaft. As will be detailed herein, some present disclosure propulsion system 26 embodiments are configured to combust hydrogen to produce propulsion power, and other present disclosure propulsion system 26 embodiments are configured to combust a conventional jet fuel (e.g., kerosine), or a sustainable aviation fuel (SAF), or other hydrocarbon based fuel to produce propulsion power.

The terms "forward", "leading", "aft", "trailing" may be used herein to indicate the relative position of a component or surface within the turbine engine 28. As core gas air passes through the engine 28, a "leading edge" of a stator vane or rotor blade encounters core gas air before the "trailing edge" of the same. In an engine like that shown in FIG. 2, the fan section 30 is "forward" of the compressor section 32 and the turbine section 36 is "aft" of the compressor section 32. The terms "upstream" and "downstream" used herein refer to the direction of a gas flow passing through an annular gas path of the turbine engine 28. The terms "radial" and "circumferential" may also be used herein with respect to the rotational axis of the turbine engine 28.

The terms "substantially", "generally" and/or "about" as contemplated herein are used with refer to a degree of deviation based on experimental error typical for the particular property identified. The latitude provided the terms "substantially", "generally" and/or "about" will depend on the specific context and particular property and can be readily discerned by those skilled in the art. The terms "substantially", "generally" and/or "about" are not intended to either expand or limit the degree of equivalents which may otherwise be afforded a particular value.

Figure 3:
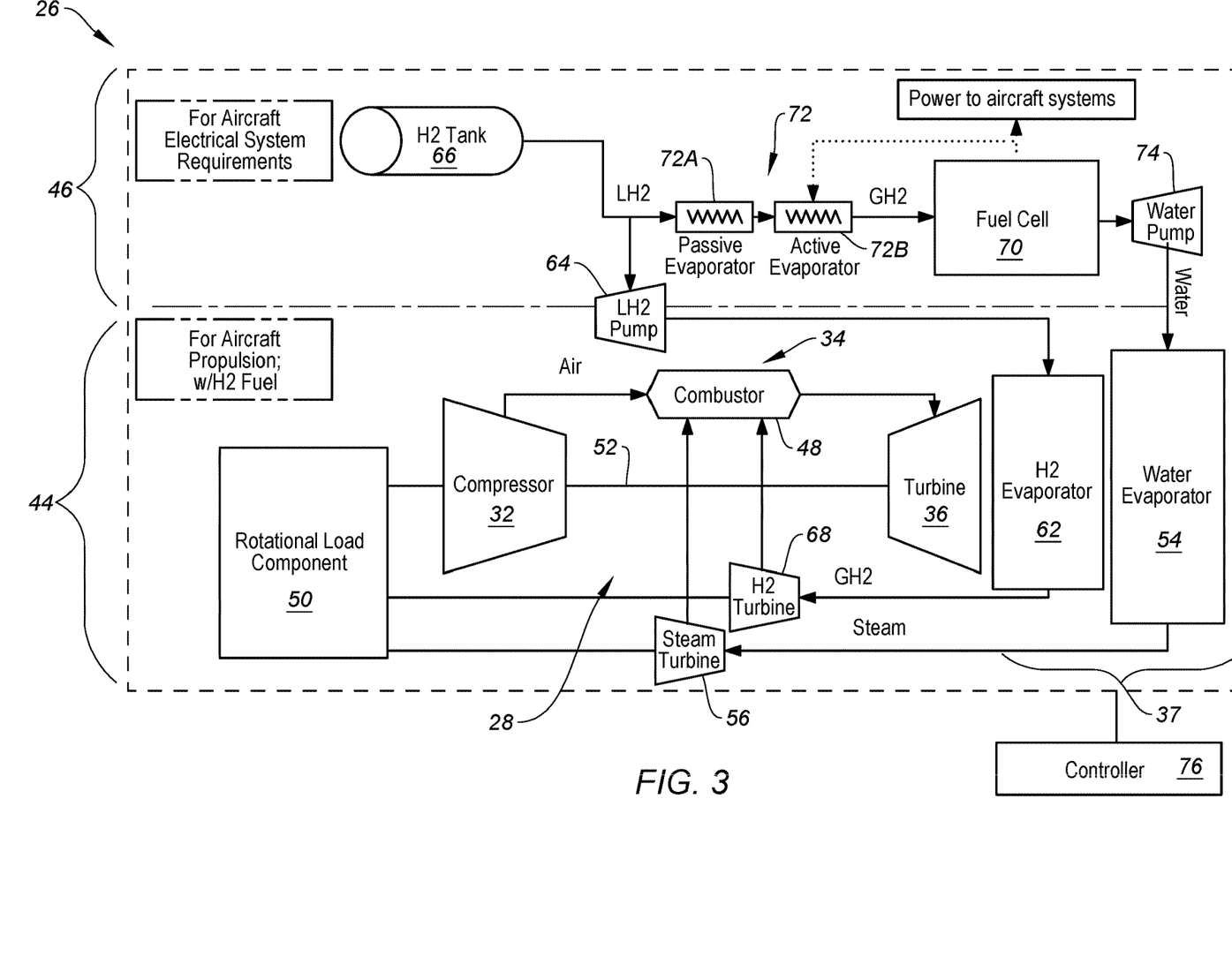
FIG. 3 is a schematic representation of a present disclosure propulsion system embodiment.
Figure 4:
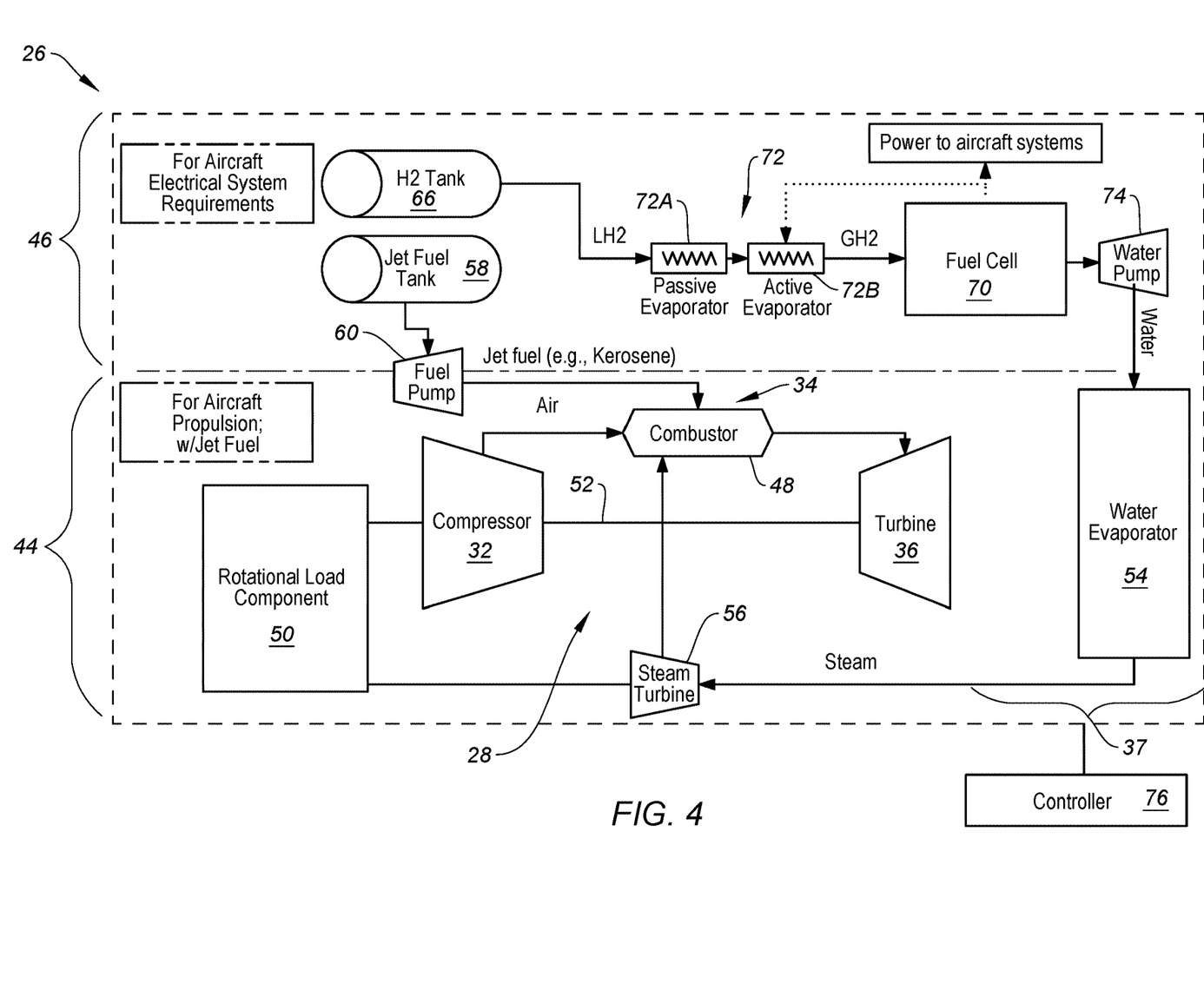
FIG. 4 is a schematic representation of a present disclosure propulsion system embodiment.

FIGS. 3 and 4 diagrammatically illustrate present disclosure propulsion system 26 embodiments that include a turbine engine segment 44 and a fuel cell segment 46. The turbine engine segment 44 includes a turbine engine 28 diagrammatically shown as having a compressor section 32, a combustor 48, and a turbine section 36. The turbine engine 28 is in drive communication with a rotational load component 50; i.e., the propulsion system 26 is configured so that the turbine engine 28 drives the rotational load component 50. As will be described herein, in some system 26 embodiments other components (e.g., a steam turbine 56, a gaseous hydrogen turbine 68, or the like) may also be in drive communication with the rotational load component 50. The rotational load component 50 represents a load that may be driven (at least in part) by the turbine engine 28, such as a propeller, a reduction gear box, a fan, a rotor, or the like, or any combination thereof. For example, a reduction gear box may be driven by the turbine engine 28 (and/or other components) and, in turn, the reduction gear box may be in drive communication with the fan, propeller, rotor, or the like. FIGS. 3 and 4 diagrammatically illustrate a turbine engine 28 having a shaft 52 connecting the compressor section 32 to the turbine section 36 and the rotational load component 50. The shaft 52 represents a single shaft or multiple shafts; e.g., a low pressure shaft and a high pressure shaft. The compressor section 32 represents a single compressor section or a plurality of compressor sections; e.g., a high pressure compressor ("HPC") and a low pressure compressor ("LPC"). The compressor section 32 may include axial type compressors, or centrifugal type compressors, or any combination of axial and radial compressors. The turbine section 36 represents a single turbine section or a plurality of turbine sections; e.g., a high pressure turbine ("HPT") and a low pressure turbine ("LPT"). The present disclosure is not limited to any particular turbine engine 28 configuration.

The turbine engine segment 44 of the present disclosure propulsion system 26 embodiments shown in FIGS. 3 and 4 also includes a water/exhaust heat exchanger 54 (labeled as "Water Evaporator") disposed within the exhaust gas stream exiting the turbine section 36 of the turbine engine 28; i.e., within the turbine exhaust section 37. The water/exhaust heat exchanger 54 is configured to receive a flow of liquid water and subject that liquid water to the high temperature exhaust gas stream exiting the turbine section 36. Thermal energy transferred from the exhaust gas stream to the liquid water via the water/exhaust heat exchanger 54 causes the liquid water to change from a liquid phase to a "gaseous phase"; i.e., steam, superheated steam, and the like. The water/exhaust heat exchanger 54 is configured to keep the flow of liquid water separate from the high temperature exhaust gas stream. The term "gaseous phase" as used for water herein represents the fact that steam is a substance containing water in the gas phase.

The turbine engine segment 44 of the present disclosure propulsion system 26 embodiments shown in FIGS. 3 and 4 also includes a steam turbine 56. The steam turbine 56 may be configured to utilize a flow of steam from the water/exhaust heat exchanger 54 to provide propulsion power that may be used to drive the rotational load component 50. Some amount of steam may be provided (e.g., from the steam turbine 56) to the combustor 48 of the turbine engine 28 to facilitate combustion therein. The present disclosure propulsion system 26 does not require a steam turbine 56, however. In those propulsion system 26 embodiments that include a steam turbine 56, the present disclosure is not limited to any particular steam turbine 56 configuration. In those propulsion system 26 embodiments that do not include a steam turbine 56, steam from the water/exhaust heat exchanger 54 may be provided directly to the combustor 48. FIGS. 3 and 4 diagrammatically illustrate the flow of water from the fuel cell (detailed herein) to the water/exhaust heat exchanger 54, the flow of steam from the water/exhaust heat exchanger 54 to the steam turbine 56, and the flow of steam from the steam turbine 56 to the combustor 48. In some embodiments, the present disclosure system 26 may include fluid flow control devices within the aforesaid water/steam flow paths to control the flow of the water and steam. Some or all of these fluid flow control devices may be controlled by a controller 76 (detailed herein) to accomplish the operation of the present disclosure propulsion system 26.

The present disclosure propulsion system 26 embodiment shown in FIG. 3 also includes a jet fuel tank 58 and a jet fuel pump 60. The jet fuel tank 58 is configured to contain a conventional jet fuel (e.g., kerosine), or a sustainable aviation fuel (SAF), or other hydrocarbon based fuel for combustion within the turbine engine combustor 48. The jet fuel pump 60 is configured to provide an appropriate flow of jet fuel into the combustor 48 during engine 28 operation. The present disclosure system may include fluid flow control devices within the aforesaid jet fuel flow paths to control the flow of jet flow to the combustor 48. Some or all of these fluid flow control devices may be controlled by a controller 76 (detailed herein) to accomplish the operation of the present disclosure propulsion system 26.

The present disclosure propulsion system 26 embodiment shown in FIG. 3 also includes a hydrogen/exhaust heat exchanger 62 (labeled as "H2 evaporator" in FIG. 3) disposed within the exhaust gas stream exiting the turbine section 36 of the turbine engine 28; i.e., within the turbine exhaust section 37. The hydrogen/exhaust heat exchanger 62 is configured to receive a flow of liquid hydrogen and subject that liquid hydrogen to the high temperature exhaust gas stream exiting the turbine section 36 during operation of the turbine engine 28. The thermal energy transferred from the exhaust gas stream to the liquid hydrogen via the hydrogen/exhaust heat exchanger 62 causes the liquid hydrogen ("LH2") to change from a liquid phase to a gaseous phase ("GH2"). The hydrogen/exhaust heat exchanger 62 is configured to keep the flow of liquid hydrogen separate from the high temperature exhaust gas stream. As detailed herein, the system 26 shown in FIG. 3 also includes a liquid hydrogen pump 64 configured to provide a flow of liquid hydrogen from a liquid hydrogen source (e.g., a liquid hydrogen fuel tank 66) to the hydrogen/exhaust heat exchanger 62.

In the system embodiment shown in FIG. 3, the hydrogen/exhaust heat exchanger 62 is disposed downstream from the turbine section 36 and the water/exhaust heat exchanger 54 is disposed downstream of the hydrogen/exhaust heat exchanger 62. The present disclosure is not limited to this series arrangement.

In some embodiments, the exhaust gas path upstream of the hydrogen/exhaust heat exchanger 62 may be configured to diffuse the exhaust gas flow prior to it engaging with the hydrogen/exhaust heat exchanger 62 to decrease the velocity of the exhaust gas. In similar manner, the exhaust gas path upstream of the water/exhaust heat exchanger 54 may be configured to diffuse the exhaust gas flow prior to it engaging with the water/exhaust heat exchanger 54 to decrease the velocity of the exhaust gas.

The present disclosure system shown in FIG. 3 includes a gaseous hydrogen turbine 68; e.g., labeled as "H2 Turbine" in FIG. 3. The gaseous hydrogen turbine 68 may be configured to utilize a flow of gaseous hydrogen from the hydrogen/exhaust heat exchanger 62 to provide propulsion power that may be used to drive the rotational load component 50. Gaseous hydrogen exiting the gaseous hydrogen turbine 68 is provided to the combustor 48 of the turbine engine 28 for combustion therein. The present disclosure propulsion system 26 does not require a gaseous hydrogen turbine 68, however. In those propulsion system 26 embodiments that include a gaseous hydrogen turbine 68, the present disclosure is not limited to any particular gaseous hydrogen turbine 68 configuration.

The system diagrammatically shown in FIG. 3 has a flow of liquid hydrogen to the liquid hydrogen pump 64, a flow of liquid hydrogen from the liquid hydrogen pump 64 to the hydrogen/exhaust heat exchanger 62, a flow of gaseous hydrogen from the hydrogen/exhaust heat exchanger 62 to the gaseous hydrogen turbine 68, and a flow of gaseous hydrogen from the gaseous hydrogen turbine 68 to the combustor 48. The present disclosure system may include fluid flow control devices within the aforesaid hydrogen (liquid and/or gaseous) flow paths to control the flow of hydrogen. Some or all of these fluid flow control devices may be controlled by a controller 76 (detailed herein) to accomplish the operation of the present disclosure propulsion system 26.

The fuel cell segment 46 within the present disclosure propulsion system 26 embodiments shown in FIGS. 3 and 4 includes a source of liquid hydrogen (e.g., a liquid hydrogen fuel tank 66), a fuel cell 70, at least one liquid hydrogen evaporator 72, and a water pump 74. The fuel cell segment 46 shown in FIG. 3 also includes a liquid hydrogen pump 64.

The fuel cell 70 is configured to produce electrical power by reacting a fuel (e.g., hydrogen) with an oxidizer (e.g., oxygen within input air). The chemical reaction within the fuel cell 70 produces water as a byproduct of the chemical reaction. The present disclosure is not limited to any particular fuel cell 70 configuration. In some embodiments, the fuel cell 70 may include a cooling system (not shown; e.g., a dedicated cooling system that may include a heat exchanger or the like) that satisfies the cooling requirements for the fuel cell 70. The present disclosure does not require a fuel cell cooling system, and if a cooling system is included, the present disclosure is not limited to any particular fuel cell cooling system configuration.

The at least one liquid hydrogen evaporator 72 is configured to change the liquid hydrogen provided from the source of liquid hydrogen (e.g., liquid hydrogen fuel tank 66) from a liquid phase to a gaseous phase. FIG. 3 illustrates a passive evaporator 72A and an active evaporator 72B (e.g., an evaporator that includes a heat source). The passive and active evaporators 72A, 72B are diagrammatically shown to indicate that the present disclosure propulsion system 26 embodiments may use a passive evaporator 72A, or an active evaporator 72B, or some combination thereof to produce gaseous hydrogen at a temperature that is suitable for the fuel cell 70 configuration.

The water pump 74 is configured to produce a flow of water from the water produced by the fuel cell 70 to the water/exhaust heat exchanger 54 where liquid water is changed to steam (e.g., superheated steam) using thermal energy from the high temperature exhaust gas stream exiting the turbine section 36. FIGS. 3 and 4 diagrammatically illustrates the water pump 74 in fluid communication with both the fuel cell 70 and the water/exhaust heat exchanger 54, the water/exhaust heat exchanger 54 in fluid communication with the steam turbine 56, and the steam turbine 56 in fluid communication with the combustor 48. In some embodiments, the present disclosure system may include fluid flow control devices upstream or downstream of the water pump 74 to control the flow of water from the fuel cell 70 to the water/exhaust heat exchanger 54, the flow of steam from the water/exhaust heat exchanger 54 to the steam turbine 56, and the flow of steam from the steam turbine 56 to the combustor 48. Some or all of these fluid flow control devices may be controlled by a controller 76 (detailed herein) to accomplish the operation of the present disclosure propulsion system 26.

In some embodiments, the operation of components of the present disclosure propulsion system 26 may be controlled using a controller 76. The controller 76 may be in communication with system components to control the operation of the respective component and/or to receive signals from and/or transmit signals to that component to perform the functions described herein. The controller 76 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The controller 76 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The controller 76 may include, or may be in communication with, an input device that enables a user to enter data and/or instructions, and may include, or be in communication with, an output device configured, for example to display information (e.g., a visual display or a printer), or to transfer data, etc. In some embodiments, a controller 76 may be dedicated to a particular system component. In other embodiments, a controller 76 may be in communication with a plurality of system components, controlling each, or controlling one or more components with signal input from other components. In some embodiments, a controller 76 may be an engine controller typically associated with aircraft operational control (e.g., a FADEC) that is configured to control propulsion system 26 components. In some embodiments, a plurality of controllers may be configured to operate in a network configuration. The present disclosure is not limited to any particular controller architecture.

During an initial operational phase of the present disclosure propulsion system 26 (e.g., before the turbine engine is producing high-temperature exhaust gases), liquid hydrogen from the source of liquid hydrogen (e.g., the liquid hydrogen fuel tank 66) may be processed to change the hydrogen from a liquid phase to a gaseous phase (e.g., using an active evaporator powered by battery power, or ground source power or the like) and that gaseous hydrogen may be provided to the combustor for combustion. Alternatively, the system may include a source of gaseous hydrogen that may be used for this purpose. Referring to FIG. 3, the system is configured to transition from the initial operational phase to a normal operational phase, and in the normal operational phase, liquid hydrogen from the source of liquid hydrogen (e.g., the liquid hydrogen fuel tank 66) is pumped to the hydrogen/exhaust heat exchanger 62 disposed within the exhaust gas stream exiting the turbine section 36 of the turbine engine 28. Operation of the turbine engine 28 produces high-temperature exhaust gases that engage the hydrogen/exhaust heat exchanger 62 and the water/exhaust heat exchanger 54. Thermal energy is transferred from the exhaust gas stream to the liquid hydrogen via the hydrogen/exhaust heat exchanger 62 and the thermal energy transfer causes the liquid hydrogen to change from a liquid phase to a gaseous phase. The now gaseous hydrogen may be passed subsequently to the gaseous hydrogen turbine 68 to provide propulsion power that may be used to drive the rotational load component 50. The system 26, including the gaseous hydrogen turbine 68, may be alternatively configured such that the gaseous hydrogen turbine 68 also provides drive power to a system component (e.g., a generator, or a pump, or the like), or the gaseous hydrogen turbine 68 may be configured to provide component drive power instead of propulsion power. The present disclosure is not limited to any particular drive configuration for the gaseous hydrogen turbine 68. Gaseous hydrogen exiting the gaseous hydrogen turbine 68 is then provided to the combustor 48 of the turbine engine 28 for combustion therein. In those embodiments that do not include a gaseous hydrogen turbine 68, the gaseous hydrogen may be passed directly to the combustor 48.

As indicated herein, the fuel cell 70 within the fuel cell segment 46 produces water which is subsequently converted to steam within the water/exhaust heat exchanger 54 using thermal energy provided by the high-temperature exhaust gases that engage the water/exhaust heat exchanger 54. During operation of the propulsion system 26, the steam may be used to power the steam turbine 56 and is provided to the combustor 48 to facilitate combustion.

Hence, the present disclosure propulsion system 26 embodiment shown in FIG. 3 may be operated to drive the rotational load component 50 using the turbine engine 28, the gaseous hydrogen turbine 68, or the steam turbine 56, or any combination thereof.

During operation of the present disclosure propulsion system 26 embodiments shown in FIGS. 3 and 4, liquid hydrogen from the source of liquid hydrogen (e.g., the liquid hydrogen tank 66) is passed through the at least one liquid hydrogen evaporator 72 (e.g., a passive evaporator 72A, or an active evaporator 72B, or some combination thereof) to change the phase of liquid hydrogen provided from the source of liquid hydrogen from a liquid phase to a gaseous phase. The gaseous hydrogen is reacted within the fuel cell 70 with air to produce electrical energy and a water byproduct. The electrical energy may be utilized within the aircraft 20 to power a variety of electrical components, including but not limited to electric anti-icing systems, electrical environmental control systems, avionics, cabin systems, and the like. The byproduct water produced by the fuel cell 70 may be used, as detailed above, to produce propulsive power and/or to facilitate combustion within the turbine engine 28.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft propulsion system, comprising
   a gas turbine engine having a compressor section, a combustion section having a combustor, a turbine section, and a turbine exhaust section, wherein the gas turbine engine is in drive communication with a rotational load component;
   a water-exhaust heat exchanger disposed relative to the turbine exhaust section so that a flow of exhaust gas exiting the turbine section is in communication with the water-exhaust heat exchanger; and
   a fuel cell segment configured to connect with a source of liquid hydrogen, the fuel cell segment including a liquid hydrogen evaporator, a fuel cell, and a water pump, wherein the liquid hydrogen evaporator is configured to change a first flow of liquid hydrogen from the source of liquid hydrogen to a first flow of gaseous hydrogen, and the fuel cell is configured to receive a flow of air and the first flow of gaseous hydrogen and react the flow of air and the first flow of gaseous hydrogen to produce electrical power and a flow of water;

a hydrogen-exhaust heat exchanger disposed relative to the turbine exhaust section so that the flow of exhaust gas exiting the turbine section is in communication with the hydrogen-exhaust heat exchanger;

a liquid hydrogen pump configured to provide a second flow of liquid hydrogen to the hydrogen-exhaust heat exchanger for passage through the hydrogen-exhaust heat exchanger;

wherein the system is configured to provide the flow of water produced by the fuel cell to the water-exhaust heat exchanger, and the water-exhaust heat exchanger is configured to convert the flow of water to a flow of steam; and wherein the hydrogen-exhaust heat exchanger is configured to change the second flow of liquid hydrogen passing through the hydrogen-exhaust heat exchanger to a second flow of gaseous hydrogen.

2. The system of claim 1, wherein the system is configured such that the second flow of gaseous hydrogen exits the hydrogen-exhaust heat exchanger and is provided to the combustor.

3. The system of claim 2, wherein the system includes a gaseous hydrogen turbine, and the second flow of gaseous hydrogen passes through the gaseous hydrogen turbine prior to entering the combustor.

4. The system of claim 3, wherein the gaseous hydrogen turbine is configured to provide propulsion power to the rotational load component.

5. The system of claim 1, wherein the system is configured such that the flow of steam exits the water-exhaust heat exchanger and is provided to the combustor.

6. The system of claim 5, wherein the system includes a steam turbine in fluid communication with the water-exhaust heat exchanger and in fluid communication with the combustor, and the system is configured such that the steam turbine receives the flow of steam from the water-exhaust heat exchanger and the combustor receives the flow of steam from the steam turbine.

7. The system of claim 6, wherein the steam turbine is configured to provide propulsion power to the rotational load component.

8. The system of claim 1, wherein the liquid hydrogen evaporator is a passive evaporator.

9. The system of claim 1, wherein the liquid hydrogen evaporator is an active evaporator.

10. The system of claim 1, wherein the system includes a fuel pump in fluid communication with a source of jet fuel and in fluid communication with the combustor and configured to provide a flow of jet fuel to the combustor.

11. The system of claim 10, wherein the system is configured such that the flow of steam exits the water-exhaust heat exchanger and is provided to the combustor.

12. The system of claim 11, wherein the system includes a steam turbine in fluid communication with the water-exhaust heat exchanger and in fluid communication with the combustor, and the system is configured such that the steam turbine receives the flow of steam from the water-exhaust heat exchanger and the combustor receives the flow of steam from the steam turbine.

13. The system of claim 12, wherein the steam turbine is configured to provide propulsion power to the rotational load component.

14. A method of providing propulsion power to an aircraft, comprising:

providing a gas turbine engine having a compressor section, a combustion section having a combustor, a turbine section, and a turbine exhaust section, wherein the gas turbine engine is in drive communication with a rotational load component;

providing a fuel cell segment configured to connect with a source of liquid hydrogen, the fuel cell segment having a liquid hydrogen evaporator, a fuel cell, and a water pump;

providing a flow of air and a first flow of gaseous hydrogen to the fuel cell and operating the fuel cell to produce electrical power and a flow of water;

providing a first flow of liquid hydrogen from the source of liquid hydrogen to the liquid hydrogen evaporator and changing the first flow of liquid hydrogen to the first flow of gaseous hydrogen using the liquid hydrogen evaporator;

producing a second flow of gaseous hydrogen by providing a second flow of liquid hydrogen from the source of liquid hydrogen to a hydrogen-exhaust heat exchanger disposed relative to the turbine exhaust section so that a flow of exhaust gas exiting the turbine section is in communication with the hydrogen-exhaust heat exchanger, and passing the second flow of liquid hydrogen into the hydrogen-exhaust heat exchanger, wherein the hydrogen-exhaust heat exchanger is configured to change the second flow of liquid hydrogen passing through the hydrogen-exhaust heat exchanger to the second flow of gaseous hydrogen, and providing the second flow of gaseous hydrogen exiting the hydrogen-exhaust heat exchanger to the combustor;

operating the gas turbine engine to produce propulsion power to the rotational load component, and the flow of exhaust gas exiting the turbine section;

producing a flow of steam by providing the flow of water produced by the fuel cell to a water-exhaust heat exchanger disposed relative to the turbine exhaust section so that the flow of exhaust gas exiting the turbine section is in communication with the water-exhaust heat exchanger;

providing the flow of steam to the combustor during the operation of the gas turbine engine; and powering an aircraft component using the electrical power produced by the fuel cell.

15. The method of claim 14, further comprising providing a flow of jet fuel to the combustor.

* * * * *